US008400325B2

(12) United States Patent
Littleton

(10) Patent No.: US 8,400,325 B2
(45) Date of Patent: Mar. 19, 2013

(54) TEMPERATURE CONTROLLED CONDUCTING DEVICE

(76) Inventor: John Dale Littleton, Sandy Hook, KY (US)

( * ) Notice: Subject to any disclaimer, the term of this patent is extended or adjusted under 35 U.S.C. 154(b) by 422 days.

(21) Appl. No.: 12/754,953

(22) Filed: Apr. 6, 2010

(65) Prior Publication Data

US 2010/0265087 A1    Oct. 21, 2010

Related U.S. Application Data

(60) Provisional application No. 61/211,927, filed on Apr. 6, 2009.

(51) Int. Cl.
*G08B 5/00* (2006.01)

(52) U.S. Cl. ............. 340/815.4; 340/310.18; 340/425.2

(58) Field of Classification Search ............... 340/815.4, 340/815.49, 815.86, 499, 680, 14.69, 310.18, 340/425.2, 310.11; 430/564, 599, 604–605
See application file for complete search history.

(56) References Cited

U.S. PATENT DOCUMENTS

| 4,540,972 | A |   | 9/1985  | Davis |
|-----------|---|---|---------|-------|
| 4,797,087 | A | * | 1/1989  | Gitman ........................ 431/10 |
| 5,089,107 | A |   | 2/1992  | Pacheco |
| 5,573,845 | A | * | 11/1996 | Parthasarathi et al. .... 428/306.6 |
| 5,777,271 | A | * | 7/1998  | Carlson et al. ................ 174/107 |
| 5,974,226 | A |   | 10/1999 | Shaffer |
| 5,974,784 | A | * | 11/1999 | Feldman ........................ 60/272 |
| 6,053,996 | A | * | 4/2000  | Pronk et al. ................... 148/541 |
| 7,462,293 | B2| * | 12/2008 | Matsumoto et al. ............ 216/59 |

OTHER PUBLICATIONS

International Search Report and Written Opinion dated Jun. 16, 2010 for Application No. PCT/US10/030099.

* cited by examiner

*Primary Examiner* — Daniel Previl
(74) *Attorney, Agent, or Firm* — Frost Brown Todd LLC

(57) ABSTRACT

An exemplary temperature controlled power line device includes a cable operable to transmit power. The cable includes a core and an oxidizing layer. The core and the oxidizing layer may be in selective electrical communication so as to initiate and halt oxidation of the core. The core may oxidize as a result of a galvanic reaction and the cable may be connected to a control box. The control box may be used to monitor as well as control the oxidation of the core.

20 Claims, 3 Drawing Sheets

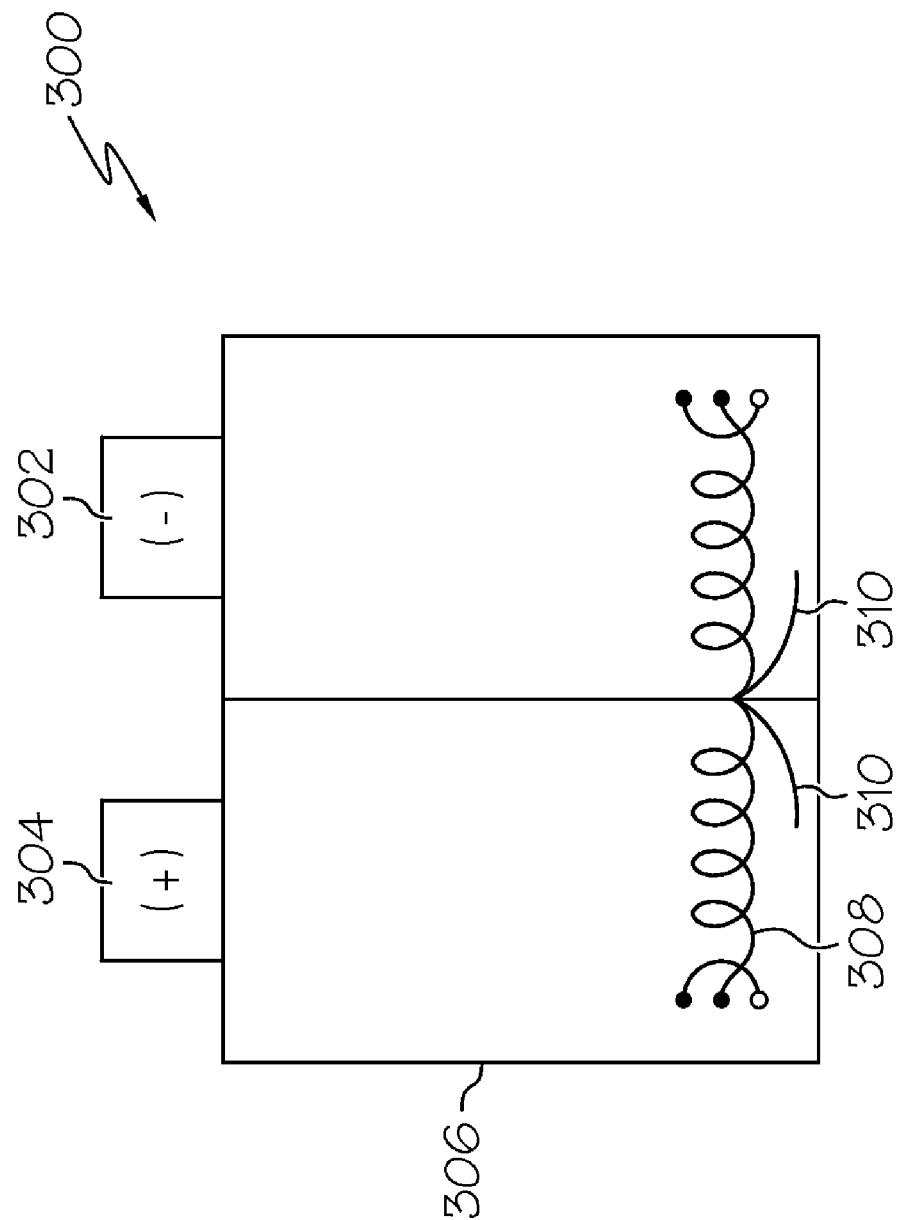

US 8,400,325 B2

TEMPERATURE CONTROLLED CONDUCTING DEVICE

PRIORITY

This application priority to and benefit of U.S. provisional application No. 61/211,927, filed on Apr. 6, 2009, which is herein incorporated by reference in its entirety.

FIELD

Embodiments of the present invention relate, in general, to an apparatus for controlling the temperature of a power line and, more particularly, to an apparatus for controlling the temperature of a power line by utilizing selective oxidation.

BACKGROUND

Power lines must properly and safely function year round regardless of the weather conditions. Under cold weather conditions, ice and frost can build up on power lines, which can cause line damage or even lines to break due to accumulated ice weight. If the weight causes the power line to break, the exposed power lines can pose a safety hazard that must be addressed immediately. Additionally, broken power or damaged lines are costly in that homes or other buildings are without power and resources must be expended to repair the damaged lines. Line damage can pose a serious risk to people and property, can leave people without power in adverse weather, and can increase overhead costs associated with maintaining power lines.

BRIEF DESCRIPTION OF THE DRAWINGS

The accompanying drawings incorporated in and forming a part of the specification illustrate several aspects of the present invention, and together with the description serve to explain the principles of the invention; it being understood, however, that this invention is not limited to the precise arrangements shown. In the drawings, like reference numerals refer to like elements in the several views. In the drawings:

FIG. 3 depicts a front view of one version of a switch box configured for use with the temperature controlled power line device.

DETAILED DESCRIPTION

Versions described herein are configured to provide an apparatus for controlling the temperature within a suspended power line. In one version, the apparatus may improve a power line's resistance to ice or other cold weather effects that may adversely affect the proper functioning of the power line.

Figure 1:
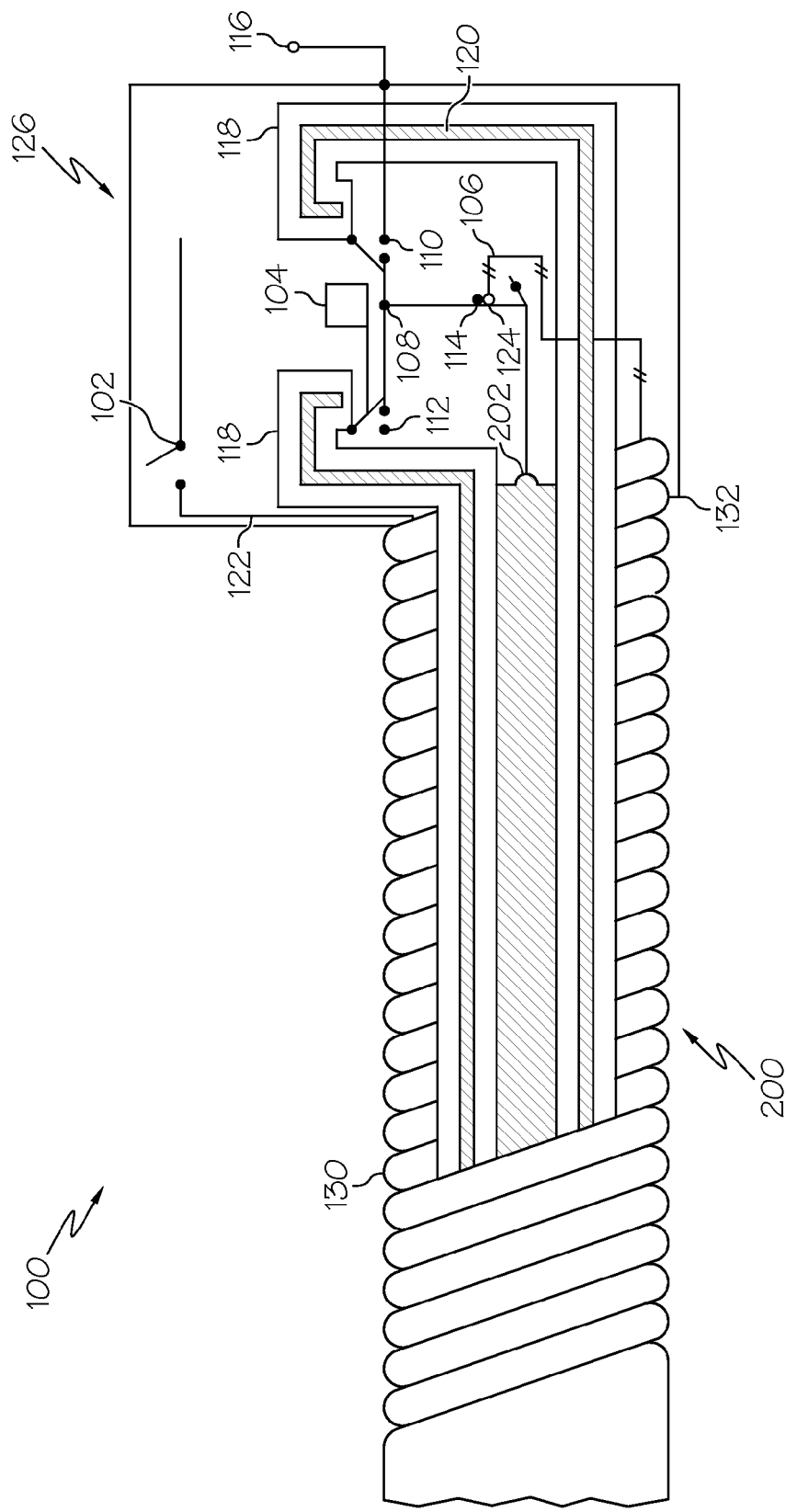
FIG. 1 depicts a side view, showing a longitudinal cross section, of one version of a temperature controlled power line device.

FIG. 1 depicts an exemplary version of a temperature controlled power line device (100). Temperature controlled power line device (100) comprises a control box (126) and a cable (200). Cable (200) is in communication with control box (126) at a connection portion (132) and extends outwardly from control box (126). In the illustrated version, cable (200) is in direct communication with control box (126), but any suitable means of communication may be used. For example, in some alternative versions, cable (200) may be in communication with control box (126) through a transformer (not shown).

Cable (200) may originate from, for example, a generating station (not shown), and may continue onward to a customer's home (not shown) or to a transformer or to any other suitable location for which it may be desirable to deliver power. As cable (200) continues to a variety of destinations, cable (200) may come into communication with control box (126) once or may be in communication with more than one control box (126) located at various points along cable (200).

Cable (200) comprises an outer wrap (130). Outer wrap (130) may comprise an aluminum material constructed as a result of a clean coal process. Alternatively, outer wrap (130) may be constructed of a typical aluminum material or any other conductive material as will be apparent to one of ordinary skill in the art in view of the teachings herein. In the illustrated version, outer wrap (130) encircles cable (200) along the length of cable (200). As seen in FIG. 1, the material of outer wrap (130) may be wrapped around cable (200) in a helical manner along the length of cable (200). Alternatively, outer wrap (130) may be a smooth, solid material that encases cable (200). Outer wrap (130) may further be encased with other layers operable to insulate outer wrap (130) from current flowing through outer wrap (130). As such, outer wrap (130) is operable to deliver power. For example, the power traveling through outer wrap (130) may comprise a 60 Hz alternating current (AC) capable of delivering 7200 kVA of power. However, the power traveling through outer wrap (130) may comprise any suitable current, which may include any suitable frequency or any suitable d amplitude. Additionally, outer wrap (130) may be able to transmit a variety of different currents simultaneously.

Figure 2:
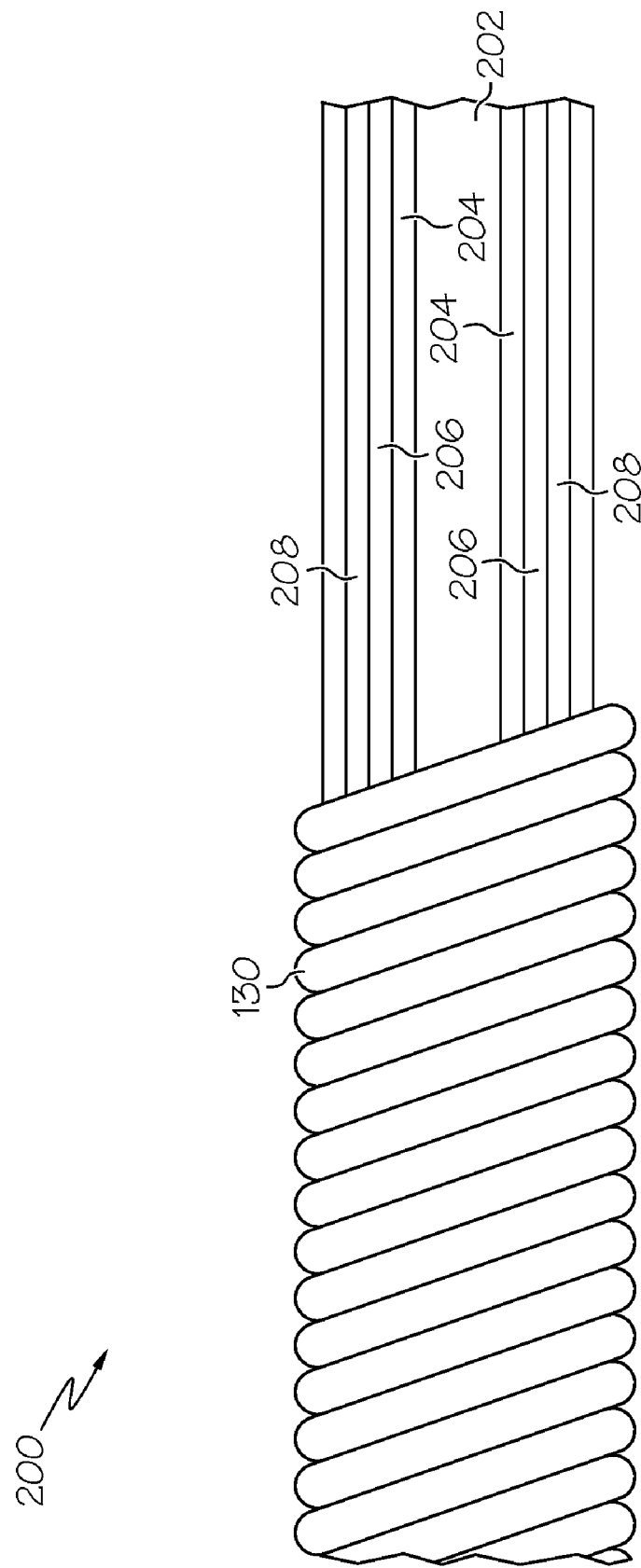
FIG. 2 depicts a side view of the temperature controlled power line device of FIG. 1 shown with a portion of the sheath removed.

FIG. 2 depicts an exposed portion of cable (200) including a core (202). Encasing core (202) is a first resistor layer (204), which wraps around core (202) throughout the length of cable (200). However, first resistor layer (204) may wrap around any suitable amount of cable (200). Encasing first resistor layer (204) through the length of cable (200) is an oxidizing layer (206). However, oxidizing layer (206) may encase any suitable amount of first resistor layer (204). Encasing oxidizing layer (206) is a second resistor layer (208), which wraps around oxidizing layer (206) throughout the length of oxidizing layer (206). However, second resistor layer (208) may encase any suitable portion of oxidizing layer (208). All of core (202), first resistor layer (204), oxidizing layer (206), and second resistor layer (208) are contained within outer wrap (130). The overall size of cable (200) may be in accordance with #4 ASTM aluminum conductor steel reinforcement standards, but any suitable size and configuration for cable (200) may be used.

Between outer wrap (130) and all of core (202), first resistor layer (204), oxidizing layer (206), and second resistor layer (208) is a thin layer of material which is able to conduct heat, without conducting electrical current. For example, the layer of material may comprise a polytetraflourothylene (PTFE) material. However, any suitable material operable to insulate current while transferring heat may be used. In other alternative versions, core (202), first resistor layer (204), oxidizing layer (206), and second resistor layer (208) need not be limited to extending through the interior of outer wrap (130). For example, some portions may travel along outside of outer wrap (130), or any other suitable configuration may be used.

In the illustrated version shown in FIG. 2, core (202) and oxidizing layer (206) are arranged such that core (202) and oxidizing layer (206) are not in contact with each other. Core (202) comprises a steel core mix capable of oxidation. The steel core mix may comprise a mixture of at least 3% steel. However, any suitable mixture of materials may be used which are capable of oxidizing in a heat producing manner. Oxidizing layer (206) may comprise any suitable material capable of oxidizing core (202) upon contact with core (202) or upon coming into electrical communication with core (202) as will be discussed in further detail below. For example, oxidizing layer (206) may comprise a mixture comprising at least 21% aluminum.

First resistor layer (204) and second resistor layer (208) may comprise, for example, a heat resistance and inhibitor wax. However, first resistor layer (204) and second resistor layer (208) may comprise any suitable material as would be apparent to one of ordinary skill in the art in view of the teachings herein. First resistor layer (204) is positioned within outer wrap (130) so as to insulate core (202) from oxidizing layer (206). In the illustrated version, first resistor layer (204) is positioned between core (202) and oxidizing layer (206) along the length of core (202). However, in other alternative versions, first resistor layer (204) may be positioned at various selected locations along core (202) rather than as a continuous layer. Second resistor layer (208) may comprise a substantially similar material as first resistor layer (204).

Core (202), first resistor layer (204), oxidizing layer (206), and second resistor layer (208) extend through center of cable (200) and are connected to control box (126) as shown in FIG. 1.

Returning to FIG. 1, which depicts control box (126), control box (126) is constructed to receive core (202), first resistor layer (204), oxidizing layer (206), and second resistor layer (208). Control box (126) is operable to aid in controlling the oxidation of core (202) such that core (202) may be selectively oxidized as needed to produce heat. Generally, as the temperature of cable (200) drops as a result of the outside temperature dropping, the temperature of cable (200) may drop below freezing, thus introducing the possibility of ice building up on cable (200). Control box (126) may then, or prior to freezing, initiate oxidation of core (202), which causes the temperature of core (202) to rise as a result of the oxidation. As the temperature of core (202) rises, cable (200) temperature also rises, which causes cable (200) to resist or melt any build up of frozen particles on cable (200). Furthermore, as the outside temperature then rises such that freezing is no longer a concern, control box (126) may aid in halting oxidizing of core (202). For exemplary purposes, control box (126) may be set to begin oxidizing of core (202) when the environmental temperature surrounding cable (200) drops below 34 degrees Fahrenheit and may further be set to halt oxidizing core (202) when the environmental temperature surrounding cable (200) rises above 38 degrees Fahrenheit.

Within control box (126), first resistor layer (204) and second resistor layer (208) are connected to an inhibitor material portion (118). Inhibitor material portion (118) comprises substantially the same material as first resistor layer (204) and second resistor layer (208). Inhibitor material portion (118) is operable to electrically insulate oxidizing layer (206) from core (202). Oxidizing layer (206) is in communication with an oxidation wax (120), which performs substantially the same functions as oxidizing layer (206), and thereby is able to provide a medium of communication between oxidizing layer (206) and core (202) to facilitate oxidation of core (202).

Within control box (126), oxidizing layer (206) and core (202) are in selective communication with each other through a series of wires and switches. Oxidizing layer (206) and core (202) are connected through wires to a connection portion (108), which serves as a junction through which current may flow between oxidizing layer (206) and core (202) to facilitate oxidation of core (202).

Oxidizing layer (206) may comprise a first oxidizing portion (134) and a second oxidizing portion (136), which are both in communication with connection portion (108). A first switch (110) is located between first oxidizing portion (134) and connection portion (108). First switch (110) may have a closed position and an opened position. In the closed position, first switch (110) allows current to flow freely through first switch (110) between first oxidizing portion (134) and connection portion (108). In the opened position, current is unable to pass through first switch (110).

Additionally, a second switch (112) is located between second oxidizing portion (136) and connection portion (108). Second switch (112) may have a closed position and an opened position. In the closed position, second switch (112) allows current to flow freely through second switch (112) between second oxidizing portion (136) and connection portion (108). In the opened position, current is unable to pass through second switch (112).

Furthermore, a third switch (124) is positioned between core (202) and connection portion (108). Third switch (124) may have a closed position and an opened position. In the closed position, third switch (124) allows current to flow freely through third switch (124) between core (202) and connection portion (108). In the opened position, current is unable to pass through third switch (124). As shown in FIG. 1, first switch (110), second switch (112), and third switch (124) must be in a closed position for oxidation of core (202) to occur. If any one of first switch (110), second switch (112), or third switch (124) is in open position, then oxidation of core (202) will halt. Thus, oxidation of core (202) may be controlled in part by closing all of first switch (110), second switch (112), and third switch (124) to oxidize core (202), and by opening at least one of first switch (110), second switch (112), and third switch (124) to halt oxidizing core. As core (202) oxidizes, heat may be released to aid in melting or resisting ice build up on cable (200).

A fuse (104) may be connected between connection portion (108) and second oxidizing portion (136). Furthermore, fuse (104) may be connected between connection portion (108) and first oxidizing portion (134). Fuse (104) may comprise a glass linked fuse or may be any suitable fuse. Fuse (104) is operable to trigger once power within temperature controlled power line device (100) exceeds a preset threshold. Once triggered, fuse (104) breaks, thereby causing an open portion between connection portion (108) and second oxidizing portion (136) or first oxidizing portion (134) such that oxidizing of core (202) ceases immediately or ceases very soon after fuse (104) triggers. After fuse (104) is triggered, a user may then reset fuse (104) so as to continue normal operation of temperature controlled power line device (100). Fuse (104) may also comprise a visual indicator, such as, for example, a light, which may illuminate when core (202) is oxidizing.

Furthermore, control box (126) may comprise a series of monitoring devices. A system heat measuring device (122) may be in communication with control box (126) and may further be in communication with the rest of temperature controlled power line device (100). System heat measuring device (122) may comprise a thermometer, or any other sensor capable of measuring heat within the temperature controlled power line device (100) so as to be used in determining whether to initiate or halt oxidation of core (202) based on temperature.

Furthermore, a first monitoring device (102), a second monitoring device (106), and a third monitoring device (114) may be used to monitor various portions of control box (126). First monitoring device (102) is connected to system heat measuring device (122), which measures the temperature of temperature controlled power line device (100). Upon reading a temperature, system heat measuring device (122) communicates the reading to first monitoring device (102).

Second monitoring device (106) may comprise a temperature sensor and may be used to monitor the surface temperature of cable (200) and/or of control box (126). Third monitoring device (114) may comprise a temperature sensor, or any other suitable thermal measuring device. Third monitoring device (114) may be used to monitor temperature of core (202). Thus, each of first monitoring device (102), second monitoring device (106), and third monitoring device (114) may have preset or configurable thresholds to compare to a particular metric associated with each of first monitoring device (102), second monitoring device (106), and third monitoring device (114). For example, first monitoring device (102) may be set to detect whether system heat measuring device (122) exceeds or falls below certain limits. Second monitoring device (106) may be set to detect whether the surface temperature of cable (200) and/or control box (126) exceeds or falls below certain limits. Third monitoring device (114) may be set to detect whether the temperature of core (202) exceeds or falls below certain limits. As a result, first monitoring device (102), second monitoring device (106), and third monitoring device (114) may be used in communication with first switch (110), second switch (112), and third switch (124) to synchronously control oxidation of core (202) such that core (202) oxidizes when cable (200) or any other suitable portion falls below a predetermined temperature and such that core (202) halts oxidizing when cable (200) or any other suitable portion rises above a predetermined temperature.

Connected to control box (126) is an override switch (116), which is capable of overriding the contact between core (202) and oxidizing layer (206). Thus, by engaging override switch (116), if temperature controlled power line device (100) is such that core (202) is oxidizing, override switch (116) can engage any of first switch (110), second switch (112), or third switch (124) to manually switch one of the aforementioned switches to an opened position, which would halt oxidation of core (202). Alternatively, override switch (116) may be engaged to force all of first switch (110), second switch (112), and third switch (124) into a closed position, which would then force oxidation of core (202).

FIG. 3 depicts a switch box (300), which is in communication with temperature controlled power line device (100). Generally, switch box (300) is in communication with first switch (110), second switch (112), and third switch (124). Switch box (300) comprises a body (306), a negative post (302), and a positive post (304). Furthermore, switch box (300) comprises an induction coil (308) and a plurality of triggers (310).

Negative post (302) and positive post (304) are in communication with connection portion (108) and are operable to deliver current to connection portion (108), and thereby deliver power to temperature controlled power line device (100) to facilitate oxidation of core (202). Body (306) may comprise a heat producing transformer. Induction coil (308) may be in communication with body (306) to facilitate varying voltages communicated to connection portion (108). Furthermore, plurality of triggers (310) may be configured to induce first switch (110), second switch (112), and third switch (124) to a closed position and in conjunction with delivering current to temperature controlled power line device (100), are operable to initiate oxidizing core (202).

In summary, numerous benefits have been described which result from employing the concepts of the invention. The foregoing description of one or more embodiments of the invention has been presented for purposes of illustration and description. It is not intended to be exhaustive or to limit the invention to the precise form disclosed. Obvious modifications or variations are possible in light of the above teachings. The one or more embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. An apparatus comprising:
   (a) a cable configured to deliver power, wherein the cable comprises an outer wrap and an interior portion positioned within the outer wrap;
   (b) an inner core extending through the interior of the cable;
   (c) an oxidizing layer extending through the interior of the cable, wherein the oxidizing layer and the inner core remain electrically separate from each other; and
   (d) a switching device in communication with the inner core and in further communication with the oxidizing layer, wherein the switching device is configured to selectively initiate oxidation of the inner core.

2. The apparatus of claim 1, wherein the switching device is further configured to selectively halt oxidation of the inner core.

3. The apparatus of claim 1, further comprising a wax layer positioned between the inner core and the oxidizing layer, wherein the wax layer is configured to electrically insulate the inner core from the oxidizing layer.

4. The apparatus of claim 1, wherein the inner core comprises a steel core mixture comprising at least 3% steel.

5. The apparatus of claim 1, wherein the oxidizing layer comprises an aluminum mixture comprising at least 21% aluminum.

6. The apparatus of claim 1, further comprising a plurality of thermal sensors configured to monitor the temperature of a plurality of selected portions of the apparatus.

7. The apparatus of claim 1, further comprising an override feature, wherein the override feature is configured to force oxidation of the inner core.

8. The apparatus of claim 7, wherein the override feature is further configured to halt the oxidation of the inner core.

9. The apparatus of claim 1, further comprising a plurality of switches, wherein each of the plurality of switches are in communication with the inner core and the oxidizing layer, wherein each of the plurality of switches has an open position and a closed position, wherein each of the plurality of switches must be in the closed position before oxidation of the inner core may occur.

10. The apparatus of claim 9, further comprising a fuse in communication with at least one of the plurality of switches, wherein triggering the fuse causes the fuse to open a wire in communication with at least one of the plurality of switches.

11. An apparatus comprising:
    (a) a cable configured to deliver power, the cable having a center axis extending through a center of cable, wherein at least a portion of the cable corresponding with the center axis selectively oxidizes in a controlled manner; and (b) a control box in communication with the cable, wherein the control box is configured to monitor the oxidation of at least a portion of the cable, wherein the control box is further configured to selectively initiate or halt the oxidation of at least a portion of the cable.

12. The apparatus of claim 11, wherein at least a portion of cable oxidizes as a result of a galvanic reaction.

13. The apparatus of claim 11, further comprising a fuse in communication with the control box, wherein the fuse is operable to visibly indicate when at least a portion of the cable oxidizes in a controlled manner.

14. The apparatus of claim 11, wherein the control box is in communication with a plurality of thermal sensors, wherein the thermal sensors are operable to measure the temperature associated with various portions of the control box.

15. The apparatus of claim 11, further comprising an inhibitor wax, wherein the inhibitor wax is operable to insulate the at least a portion of the cable configured to oxidize.

16. The apparatus of claim 11, wherein the oxidation of the at least a portion of the cable is initiated by a mixture of at least 21% aluminum and a mixture of at least 3% steel.

17. The apparatus of claim 11, further comprising a plurality of switches that must be in the closed position for oxidation of the at least a portion of the cable to occur.

18. The apparatus of claim 11, wherein the at least a portion of the cable configured to oxidize extends along the length of the cable.

19. The apparatus of claim 11, further comprising an override feature, wherein the override feature is configured to force or halt the oxidation of the at least a portion of the cable.

20. An apparatus comprising:
 (a) a cable comprising a steel core, wherein the steel core extends longitudinally along the cable;
 (b) an inhibitor wax surrounding the steel core and extending longitudinally along the cable, the inhibitor wax configured to electrically isolate the steel core in a selectively controlled manner;
 (c) an oxidizing layer surrounding the inhibitor wax and extending longitudinally along the cable, the oxidizing layer configured to oxidize the steel core; and
 (d) a control device configured to initiate and halt the oxidizing of the steel core.

* * * * *